US008954481B2

(12) United States Patent
Fay et al.

(10) Patent No.: US 8,954,481 B2
(45) Date of Patent: Feb. 10, 2015

(54) MANAGING THE PRODUCT OF TEMPORARY GROUPS IN A COMMUNITY

(75) Inventors: Peter Fay, Westford, MA (US); Barry Alan Feigenbaum, Austin, TX (US); Elizabeth Vera Woodward, Austin, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 13/467,200

(22) Filed: May 9, 2012

(65) Prior Publication Data

US 2013/0304772 A1 Nov. 14, 2013

(51) Int. Cl.
*G06F 17/30* (2006.01)

(52) U.S. Cl.
USPC .......................................... 707/821; 705/7.13

(58) Field of Classification Search
CPC .......................... G06F 7/30067; G11B 27/105
USPC .......... 707/1/1, 758, 802, 617, 736, 102, 748; 717/171, 138, 101, 124; 705/7
See application file for complete search history.

(56) References Cited

U.S. PATENT DOCUMENTS

| | | | | |
|---|---|---|---|---|
| 6,647,383 | B1 * | 11/2003 | August et al. | 1/1 |
| 6,766,481 | B2 * | 7/2004 | Estep et al. | 717/124 |
| 7,133,839 | B2 * | 11/2006 | Inoue et al. | 705/27.2 |
| 7,904,322 | B2 * | 3/2011 | Gauger | 705/7.13 |
| 7,996,469 | B1 | 8/2011 | Wang et al. | |
| 8,131,739 | B2 * | 3/2012 | Wu et al. | 707/758 |
| 8,412,707 | B1 * | 4/2013 | Mianji | 707/736 |
| 8,458,673 | B2 * | 6/2013 | Gadea et al. | 717/138 |
| 2003/0014512 | A1 | 1/2003 | Tanimoto | |
| 2003/0192029 | A1 * | 10/2003 | Hughes | 717/101 |
| 2003/0216971 | A1 * | 11/2003 | Sick et al. | 705/26 |
| 2005/0096996 | A1 * | 5/2005 | Hall et al. | 705/26 |
| 2006/0004837 | A1 * | 1/2006 | Genovker et al. | 707/102 |
| 2007/0245002 | A1 * | 10/2007 | Nguyen et al. | 709/223 |
| 2008/0052163 | A1 * | 2/2008 | Koh | 705/14 |
| 2008/0098005 | A1 * | 4/2008 | Goradia | 707/10 |
| 2009/0013318 | A1 * | 1/2009 | Aderton et al. | 717/171 |
| 2009/0043686 | A1 * | 2/2009 | Matsumoto | 705/37 |
| 2009/0234876 | A1 * | 9/2009 | Schigel et al. | 707/102 |
| 2010/0031159 | A1 * | 2/2010 | Hummel | 715/741 |
| 2011/0238591 | A1 * | 9/2011 | Kerr et al. | 705/321 |
| 2012/0005215 | A1 * | 1/2012 | Chow | 707/748 |
| 2012/0094721 | A1 * | 4/2012 | Brondmo et al. | 455/566 |

* cited by examiner

*Primary Examiner* — James Trujillo
*Assistant Examiner* — Thong Vu
(74) *Attorney, Agent, or Firm* — Garg Law Firm, PLLC; Rakesh Garg; William J. Stock

(57) ABSTRACT

A method, system, and computer program product for managing the products of a sub-community operating within a community are provided in the illustrative embodiments. The sub-community is defined in an application executing on a data processing system using a processor and a memory. The community comprises a set of members working for a common objective. The sub-community comprises a subset of the set of members working for a part of the common objective. The defining of the sub-community also configures a closing condition for the sub-community. A plurality of members is added to the sub-community. The sub-community is created.

20 Claims, 9 Drawing Sheets

MANAGING THE PRODUCT OF TEMPORARY GROUPS IN A COMMUNITY

TECHNICAL FIELD

The present invention relates generally to a computer implemented method, system, and computer program product for managing the products produced by a temporary group of users in a community of users. Particularly, the present invention relates to a computer implemented method, system, and computer program product for managing the temporary sub-groups within a community of users and the work items, interim and final deliverables, produced by the temporary sub-group.

BACKGROUND

Description of the Related Art

A community is a set or group of users working towards a common goal or interest. A sub-community is a subset of the community whose work pertains to a narrower objective within the goal or interest of the community.

For example, a community may be engaged in development of a software product. A sub-community within the community may be a subset of the members of the community who are engaged in the development of a particular feature or component of the software product.

SUMMARY

The illustrative embodiments provide a method, system, and computer program product for managing the products of a temporary sub-community operating within a community. An embodiment defines, in an application executing on a data processing system using a processor and a memory, the sub-community, wherein the community comprises a set of members working for a common objective, wherein the sub-community comprises a subset of the set of members working for a part of the common objective, wherein the defining configures a closing condition for the sub-community. The embodiment adds a plurality of members to the sub-community. The embodiment creates the sub-community.

BRIEF DESCRIPTION OF THE SEVERAL VIEWS OF THE DRAWINGS

The novel features believed characteristic of the embodiments are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
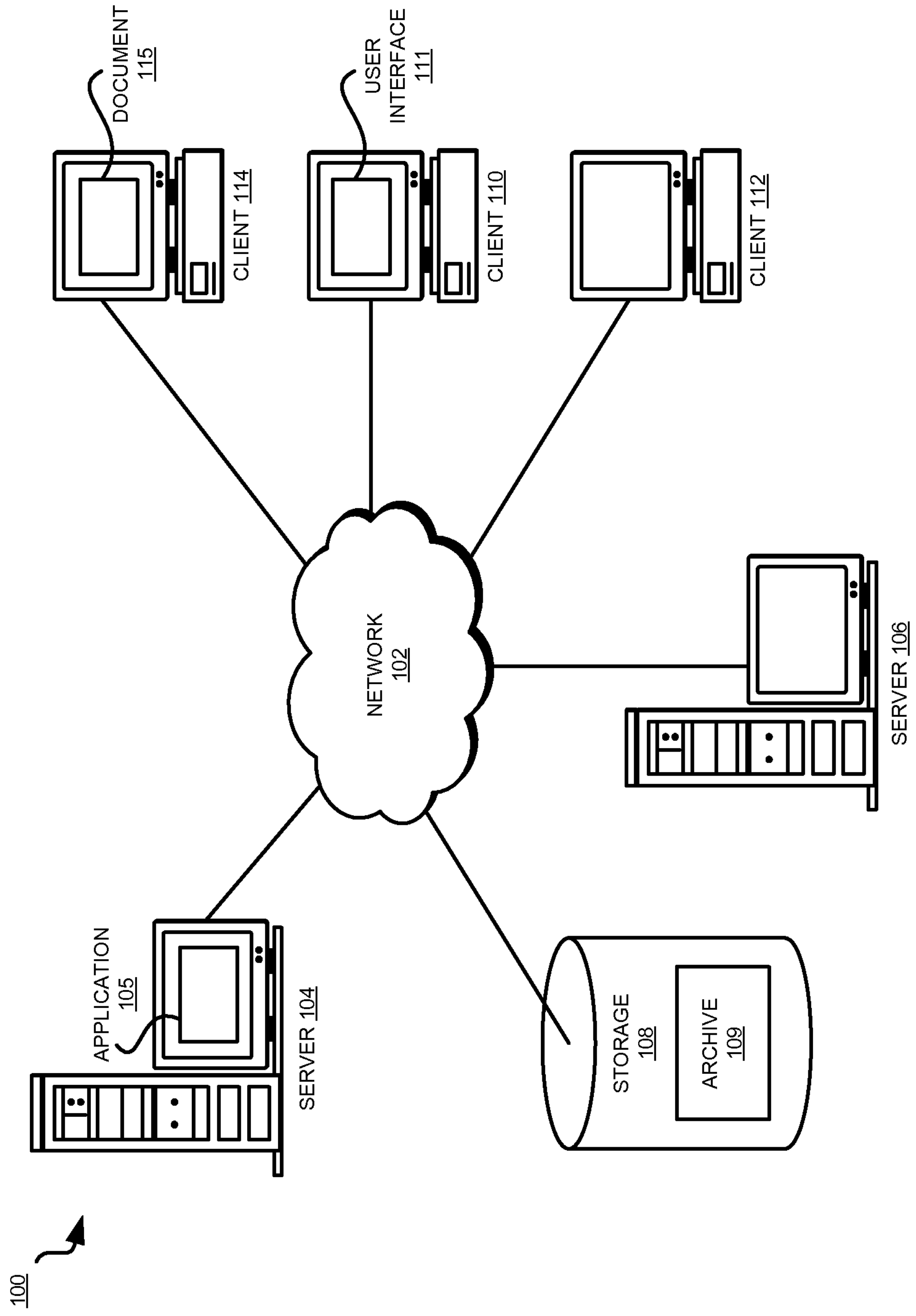
FIG. 1 depicts a pictorial representation of a network of data processing systems in which illustrative embodiments may be implemented.

The illustrative embodiments recognize that a variety of byproducts result when groups of users collaborate as a sub-community towards an objective. For example, in the process of developing a feature for a software product, the members of the group may produce not only the code for the feature that is incorporated into the software product, but also documentation, analysis, write-ups, white-papers, information disclosures, discussions on forums and blogs, new or modified wiki entries, brain-storming notes and documents, rough drafts of concepts, several versions of the feature code, and so on.

The illustrative embodiments further recognize that a sigh-community can be temporary. In other words, the illustrative embodiments recognize that a sub-community may come together for a specified duration, objective, deliverable work product (deliverable), or a combination thereof. The sub-community may subsequently close, disband, or dissolve once the duration expires, the objective is achieved, the deliverable work product is delivered, the community or sub-community determines that the initial goal is no longer appropriate due to changing circumstances or a combination thereof. A sub-community may also be closed when certain criteria are satisfied, for instance, by members vote, or number of views or posts in a certain period. Within the scope of this disclosure, a sub-community is regarded as temporary unless otherwise specified within the context in which the sub-community is described.

The illustrative embodiments recognize that to distinguish a deliverable work product of a sub-community from the byproducts of the sub-community's efforts is often difficult. For example, a member of a community may be only interested in the single deliverable work product of a sub-community. However, when the member searches for the contributions of the sub-community either through a search mechanism or by perusing the community artifacts, the results may show not just the deliverable work product, if available, but also some or all of the byproducts created by the sub-community during the process of creating the deliverable work product. Additionally, is often difficult to establish the purpose of the sub-community, the conditions under which sub-community will disband, and whether the sub-community is active or has closed.

Furthermore, the illustrative embodiments recognize that once a sub-community closes, separating the deliverables from the byproducts may become increasingly difficult due to the passage of time, fading memories of the sub-community members, migration of the sub-community members, or a combination of these and other factors. The illustrative embodiments also recognize that many sub-communities may be presently operating in a community, many sub-communities may have closed, and the work of the operating and the closed sub-communities is related to a common objective of the community, distinguishing deliverables from byproducts across several sub-communities becomes exponentially more difficult. Failure or difficulty in separating the deliverables from the byproducts can not only cause a loss of productivity in the community, but can also introduce errors in one or more work products of the community.

The illustrative embodiments used to describe the invention generally address and solve the above-described problems and other problems related to managing the products of sub-communities. The illustrative embodiments provide a method, system, and computer program product for managing the products of a sub-community in a community. A product of a sub-community or a member thereof is any work product, work item, artifact, element, document, or an identifiable contribution produced by that sub-community or a member thereof, including but not limited to the deliverable work products. For example, a byproduct of a deliverable is a product within the scope of the disclosure.

An embodiment enables the creation or formation of a sub-community in a manner that is useful in tracking and organizing the products produced by the sub-community members during the sub-community's existence. An embodiment further enables an automated wrap-up of a sub-community's products before or upon the closing of the sub-community. An embodiment also allows for preservation of a sub-community's products for future purposes, including but not limited to, the merging of the sub-community's content into the parent or another community, identification of additional or related work, audit of the sub-community's work, legal requirements, or governance of the community and the sub-communities in a given environment.

The illustrative embodiments are described with respect to certain deliverable work products and byproducts only as examples. Such descriptions are not intended to be limiting on the illustrative embodiments.

Similarly, the illustrative embodiments are described with respect to certain parameters, values, and data only as examples. Such descriptions are not intended to be limiting on the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a Physical or virtual data storage device, that may be available in a given data processing system configuration.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
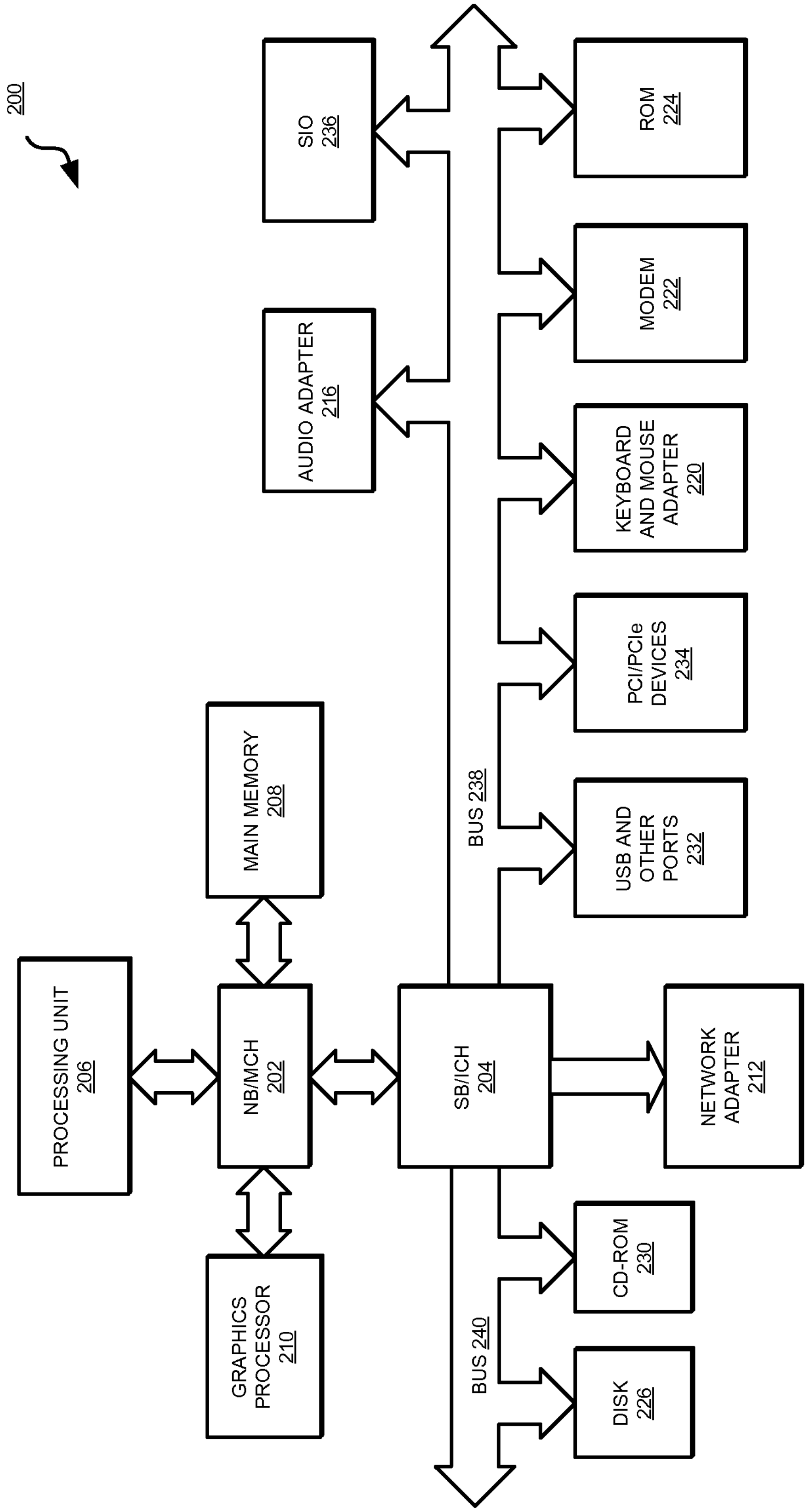
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

Application 105 in server 104 may be an application implementing an embodiment. Document 115 in client 114 is an example product produced by a member of a sub-community. Document 115 may be a deliverable work product or a byproduct. Archive 109 in storage 108 may be used by an embodiment to store some or all of the products of a sub-community. Application 105 presents user interface 111 in client 110 to facilitate activities related to creation, management, and closing a sub-community. A user of a community may also use user interface 115 to interact with a sub-community's information and products.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus TorvaldS in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile Memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
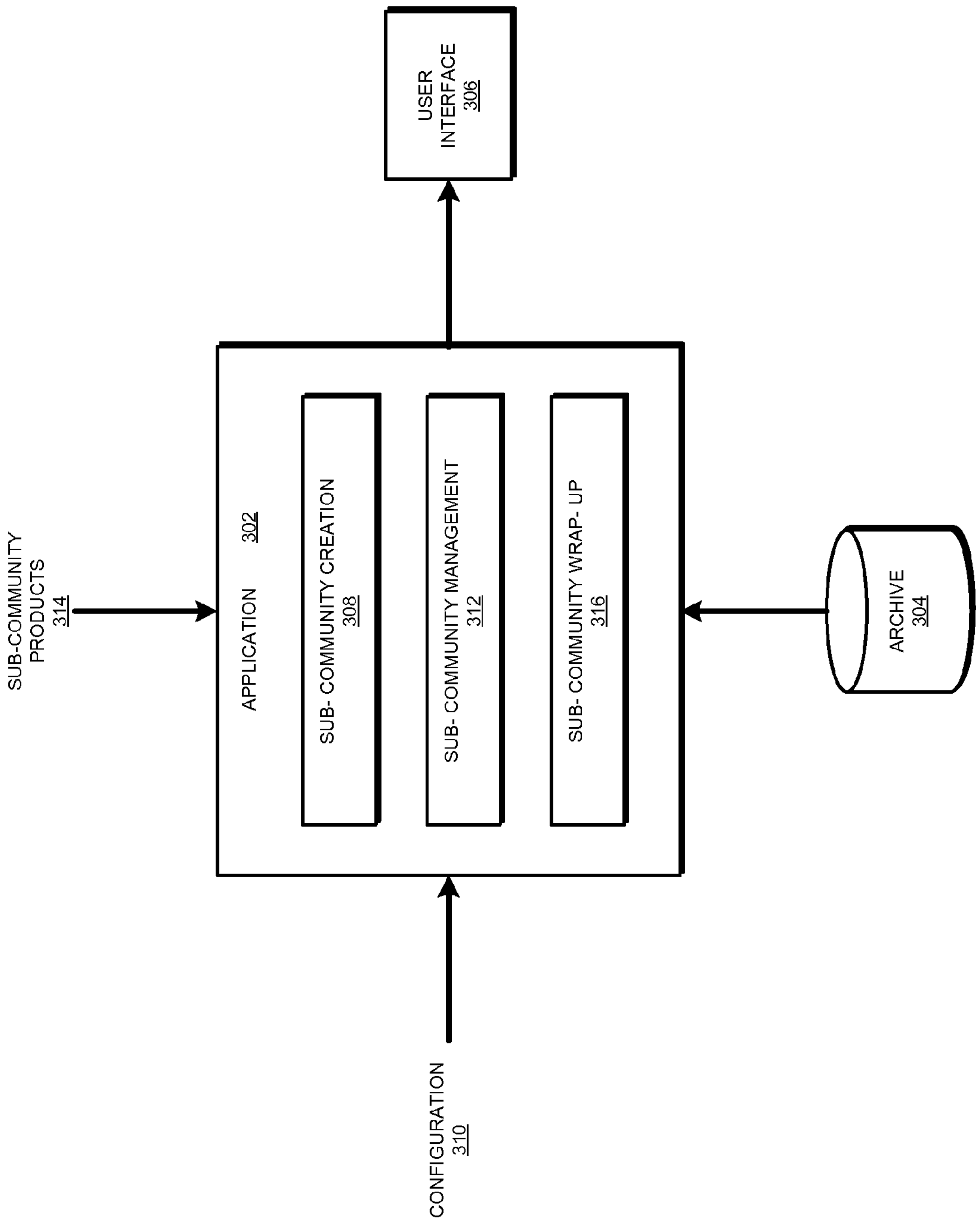
FIG. 3 depicts a block diagram of an example configuration of an application for managing the products of a sub-community in accordance with an illustrative embodiment.

With reference to FIG. 3, this figure depicts a block diagram of an example configuration of an application for managing the products of a sub-community in accordance with an illustrative embodiment. Application 302 can be implemented as application 105 in FIG. 1. Archive 304 may be implemented using archive 109 in storage 108 in FIG. 1. User interface 306 is presented from application 302 in a manner similar to the presentation of user interface 111 in FIG. 1.

The components in application 302 as depicted in FIG. 3 and as described herein are not intended to be limiting on the illustrative embodiments. Those of ordinary skill in the art will be able to conceive from this disclosure other ways of achieving similar functions in application 302 and the same are contemplated within the scope of the illustrative embodiments.

Application 302 includes creation component 308 for creating a sub-community. Creation component 308 uses configuration parameters 310 to configure the sub-community being created. For example, an administrator tasked with the creation of the sub-community may, as an example part of configuration 310, identify the members of a sub-community who should participate in the sub-community, identify members of a community other than the community in which the sub-community is being formed who should be invited to join the sub-community (and the community if sub-community membership requires membership in the parent community), specify a rule or policy to be satisfied for a user to become a member of the sub-community, or a combination thereof. Creation component 308 may automatically create a sub-community from a community based on certain criteria, for instance, members interest, subjects in their posts, or special needs. Creation component 308 is also responsible for informing members of the duration of the sub-community, or duration update by the owner.

Duration of existence of the sub-community being created may be another example part of configuration 310. A sub-community that is limited, by duration of existence is called a time-limited sub-community. A goal to achieve, a deliverable work product to deliver, a specific action taken in the community, e.g., delivery of a file by a particular name or announcement in the community forum, that indicates the sub-community has fulfilled its purpose, or a specified purpose can also be a part of configuration 310. A sub-community that is limited by a goal, objective, purpose, or deliverable is called a goal-limited sub-community.

Locations where the sub-community's products, including the deliverable work products, the byproducts, or both, will be stored can also form a part of configuration 310. For example, an administrator may specify a file-system, forum, blogs, wikis, file-sharing mechanisms, and other collaboration tooling where the sub-community members may store interim deliverables and byproducts they create while participating in the sub-community.

An initial set of resources to be used in the sub-community's operation can also form a part of configuration 310. For example, a set of bookmarks for an intranet or the internet, libraries, tools, research documents, identification of experts, and any other type of resource that may be usable in conjunction with the goal of the sub-community can be specified in configuration 310.

The example parts of configuration 310 described above are not intended to be limiting on the illustrative embodiments. Those of ordinary skill in the art will be able to conceive from this disclosure many other parameters of configuration 310 and the same are contemplated within the scope of the illustrative embodiments. Generally, an embodiment can use configuration 310 to provide an initial configuration for a sub-community being created, or an update to a previously provided configuration 310 for a sub-community already created. An administrator or an application (not shown) can provide configuration 310 to application 302 using an adaptation of user interface 306, such as, for example, a webpage or a form presented using user interface 306.

Application 302 includes management component 312 for managing a sub-community during the sub-community's operation. As an example, management component 312 may receive or identify sub-community products 314 and categorize them according to a rule associated with the sub-community. As another example, management component 312 may modify the membership of the sub-community, or modify a resource's availability to the sub-community. As another example, management component 312 may incrementally archive the sub-community's products if the sub-community is configured to have the products of the sub-community archived. As another example, management component 312 may timestamp the resources in the sub-community with an expiration date, and update those timestamps if the duration of the community changes. For time-limited sub-communities, the management function may issue a notification to the sub-community members or leaders of the impending deadline and provide a mechanism by which the leaders can extend the deadline as needed.

Generally, within the scope of the illustrative embodiments, management component 312 can perform or facilitate the performance of any management function relative to a sub-community in operation in a community. For example, in one embodiment, management component 312 can track and report the progress made by the sub-community towards a specified goal or timeline. In another embodiment, management component 312 regroups certain resources available to the sub-community by age, source, form, or relevance of the resource. For example, a bookmark previously identified as a resource for the sub-community may be converted into a document referenced by the bookmark and grouped with other similar documents in a library available to the sub-community.

Application 302 further includes wrap-up component 316 for closing a sub-community. Wrap-up component 316 performs one or more tasks associated with closing a sub-community such that the products created by the sub-community members can be suitably tagged, archived, merged, or purged, such as for later use. For example, in one embodiment, component 316 notifies an administrator a pre-determined period in advance of a time set for closing a sub-community. The administrator can trigger further tasks upon such notification, such as archiving the products of the sub-community for an audit. In one embodiment, component 316 notifies the members of the sub-community that the sub-community is about to be closed. In response to the notice, as an example, the members can conclude their work on open products, or resolve unresolved issued related to the sub-community's deliverable.

In one embodiment, component 316 selects certain products of the sub-community and merges the products with the products available to the parent community or a different community. In another embodiment, component 316 selects certain products of the sub-community and purges those selected products that are not a deliverable work product of the sub-community. In another embodiment, component 316 creates stubs corresponding to the products of the sub-community, creates a hierarchy or timeline of the development of the products using the stubs, and purges or archives the products.

In another embodiment, component 316 creates a snapshot of the hierarchy or relationships of sub-communities within the community in which the about-to-be-closed sub-community is operating. In another embodiment, component 316 creates a snapshot of the hierarchy or relationships of the deliverables of a set of sub-communities within the community, including the about-to-be-closed sub-community, and prepares a closing report for the sub-community.

In another embodiment, component 316 selects some content from the sub-community to start a different sub-community, or merge the selected content to another sub-community. As an example, a new sub-community may be started to continue the work of the original sub-community with a subset of members of the original sub-community or new members.

The operations of the components of application 302 are used only as examples. Such examples are not intended to be limiting on the illustrative embodiments. Many other wrap-up tasks will be apparent to those of ordinary skill in the art from this disclosure and the same are contemplated within the scope of the illustrative embodiments.

Figure 4:
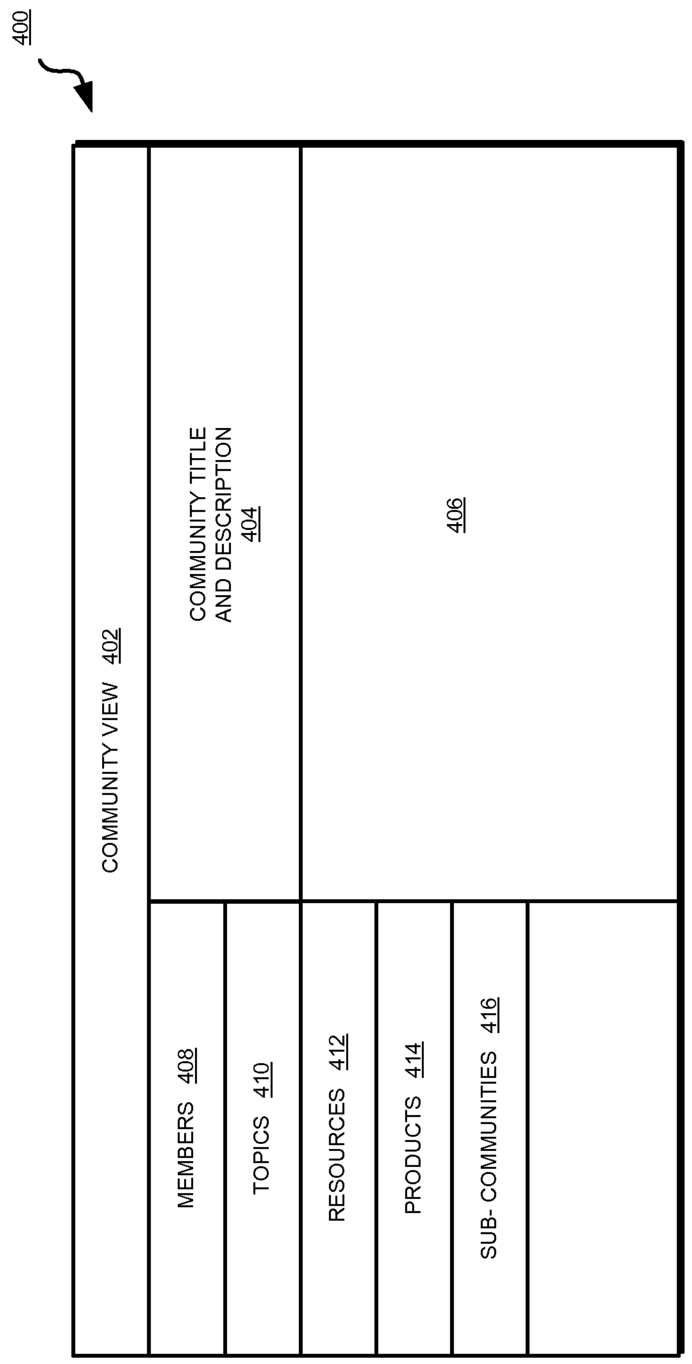
FIG. 4 depicts an example graphical view for managing sub-communities within a community in accordance with an illustrative embodiment.

With reference to FIG. 4, this figure depicts an example graphical view for managing sub-communities within a community in accordance with an illustrative embodiment. View 400 can be presented in any suitable variation using user interface 111 in FIG. 1, or user interface 306 in FIG. 3.

In an example embodiment, view 400 includes name 402 of the view. In the depicted example, view 400 is called a "community view" and presents a summarized view of the community.

Further according to an embodiment, view 400 includes title, description, and expiration date 404 of a community whose information is being presented in view 400. In one embodiment, area 406 is an area where additional information relating to a component of view 400 can be presented. For example, a logo or branding associated with the community can be displayed in area 406 when view 400 initially presents the information about a community. A hierarchical relationship of sub-communities within the community can also be displayed in the area 406.

According to an embodiment, view 400 includes reference 408 to members of the community. In one embodiment, reference 408 may be a link, which presents a list of the community's members in area 406 when clicked. Similarly, view 400 includes reference 410 to tonics relevant to the community. For example, reference 410 may include links to one or more discussions, which present the details of corresponding discussions in area 406 when clicked.

Reference 412 to resources may similarly be links to the resources available to the community members. For example, reference 412 may include links to one or more libraries, bookmarks or folders, which present the corresponding contents in area 406 when clicked. Similarly, reference 414 to products may be links to the products created by community members, products merged from previously existing sub-communities, products available to community members from sub-communities in operation, or combination thereof. For example, selecting an instance of reference 414 may present the corresponding contents in area 406.

Reference 416 to sub-communities may similarly be links to the sub-communities operating under the community. For example, reference 416 may include links to one or more active sub-communities, which present some details of the corresponding sub-communities in area 406 when clicked.

Figure 5:
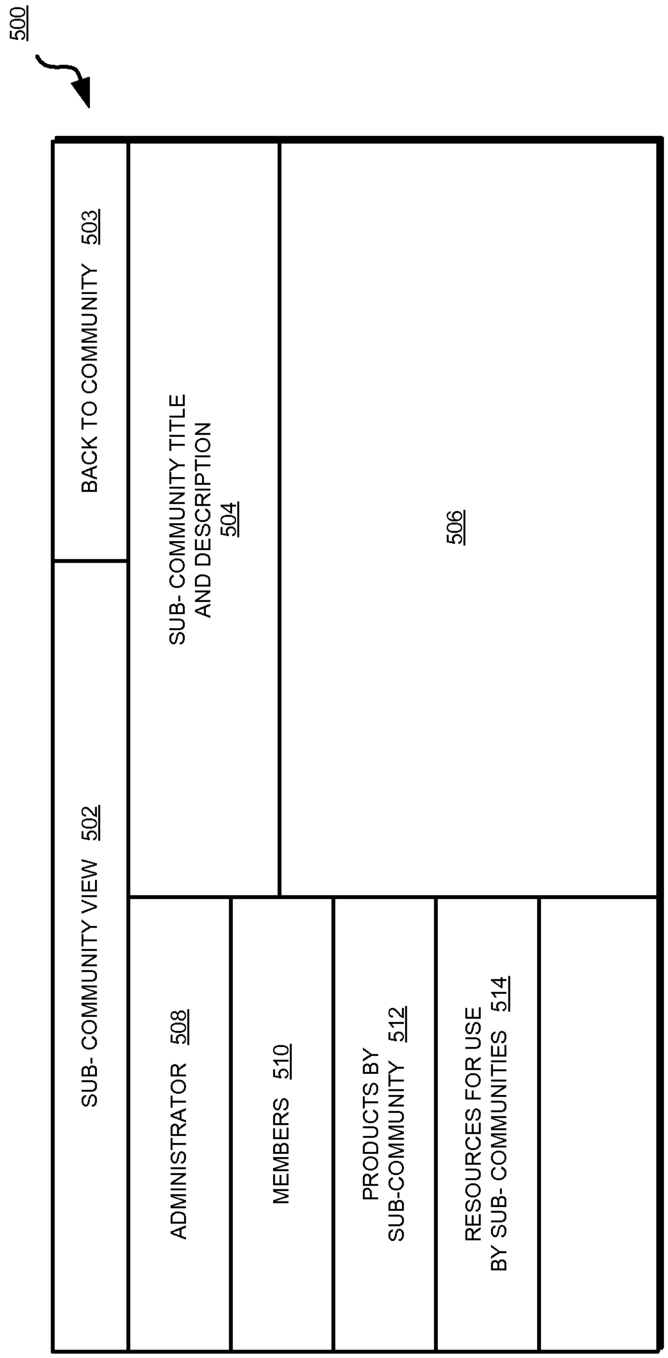
FIG. 5 depicts an example graphical view for managing a sub-community in accordance with an illustrative embodiment.

With reference to FIG. 5, this figure depicts an example graphical view for managing a sub-community in accordance with an illustrative embodiment. View 500 can be presented in any suitable variation in a manner similar to view 400 in FIG. 4.

In an example embodiment, view 500 includes name 502 of the view. In the depicted example, view 500 is called a "sub-community view" and presents a summarized view of a sub-community. Reference 503 refers back to the community to which the displayed sub-community belongs and allows a user to return to the community's information, such as to view 400 in FIG. 4.

Further according to an embodiment, view 500 includes title, description, and expiration date 504 of the sub-community whose information is being presented in view 500. In one embodiment, area 506 is an area where additional information relating to a component of view 500 can be presented. For example, a logo or branding associated with the sub-community can be displayed in area 506 when view 500 initially presents the information about a sub-community.

According to an embodiment, view 500 includes reference 508 to one or more administrators, managers, creators, or controllers of the sub-community. Reference 508 refers to the members of the sub-community. In one embodiment, references 508 and 510 may be links, which present the administrator's information or a list of the sub-community's members, respectively, in area 506 when clicked.

Similarly, view 500 includes reference 512 to products produced by the members of the sub-community. For example, reference 512 may present links to one or more deliverables or byproducts of the sub-community in area 506 when clicked. In one embodiment, such presentation of links to the products may further have associated therewith a method for selecting a product to perform an operation relative to the selected product. Some example operations relative to a product include preserving the product, deleting the product, merging the product up with the community's products, and merging the product with another product of the sub-community.

Reference 514 to resources may similarly be links to the resources available to the sub-community members. For example, reference 514 may include links to one or more libraries, bookmarks or folders, which present the corresponding contents in area 506 when clicked.

Figure 6:
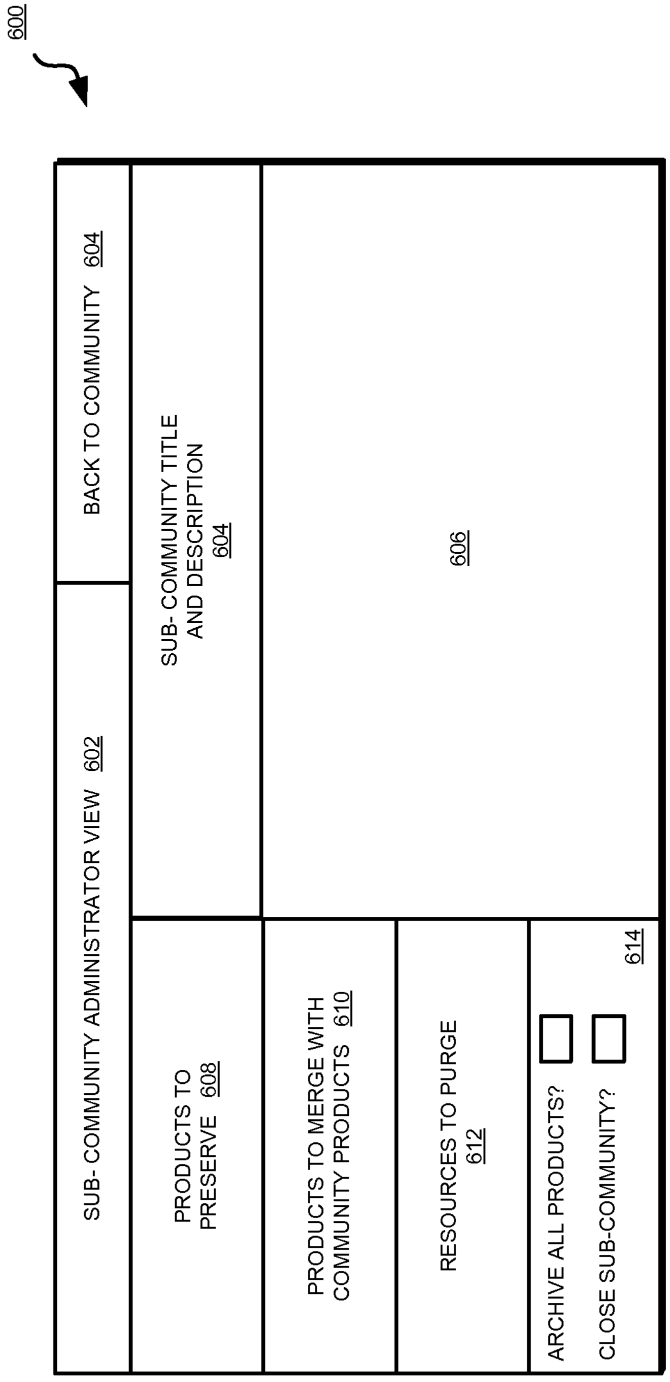
FIG. 6 depicts an example graphical view for administrating a sub-community in accordance with an illustrative embodiment.

With reference to FIG. 6, this figure depicts an example graphical view for administrating a sub-community in accordance with an illustrative embodiment. View 600 can be presented in any suitable variation in a manner similar to view 500 in FIG. 5.

In an example embodiment, view 600 includes name 602 of the view. In the depicted example, view 600 is called a "sub-community administrator view" and presents a summarized view of a sub-community with reference to which an administrative action, including but not limited to closing the sub-community, is being performed. Reference 603 refers back to the community to which the displayed sub-community belongs and allows a user to return to the community's information, such as to view 400 in FIG. 4.

Further according to an embodiment, view 600 includes title and description 604 of the sub-community being administrated in view 600. In one embodiment, area 606 is an area where additional information relating to a component of view 600 can be presented. For example, a logo or branding associated with the sub-community can be displayed in area 606 when view 600 initially presents the information about a sub-community.

According to an embodiment, view 600 includes reference 608 to certain products produced by the members of the sub-community. For example, reference 608 may present links to one or more deliverables or byproducts of the sub-community in area 606 when clicked. In one embodiment, such presentation of links to the products may further have associated therewith a method for selecting a product to perform an operation relative to the selected product. Some example operations relative to a product include preserving the product, deleting the product, and merging the product with another product of the sub-community.

According to an embodiment, view 600 includes reference 610 to certain other products produced by the members of the sub-community. For example, reference 610 may present links to one or more deliverables or byproducts of the sub-community in area 606 when clicked. In one embodiment, such presentation of links to the products may further have associated therewith a method for selecting a product to perform an operation relative to the selected product. Some example operations relative to a product merging the product with products available to the members of the community.

Reference 612 to resources may similarly be links to the resources that were available to the sub-community members during the operation of the sub-community and should be purged or moved at closing. For example, reference 612 may present the corresponding contents in area 606 when clicked.

Reference 614 may be quick-links for certain operations. For example, as depicted, one such quick-link can allow an administrator to determine whether to archive all products from the sub-community to a designated archive by selecting a checkbox or another selection mechanism. Similarly, another example quick-link can allow an administrator to close a sub-community, by performing pre-configured default sub-community closing operations, by selecting a checkbox or another selection mechanism. Any number or type of such quick-links can be included in reference 614 without limitation.

Figure 7:
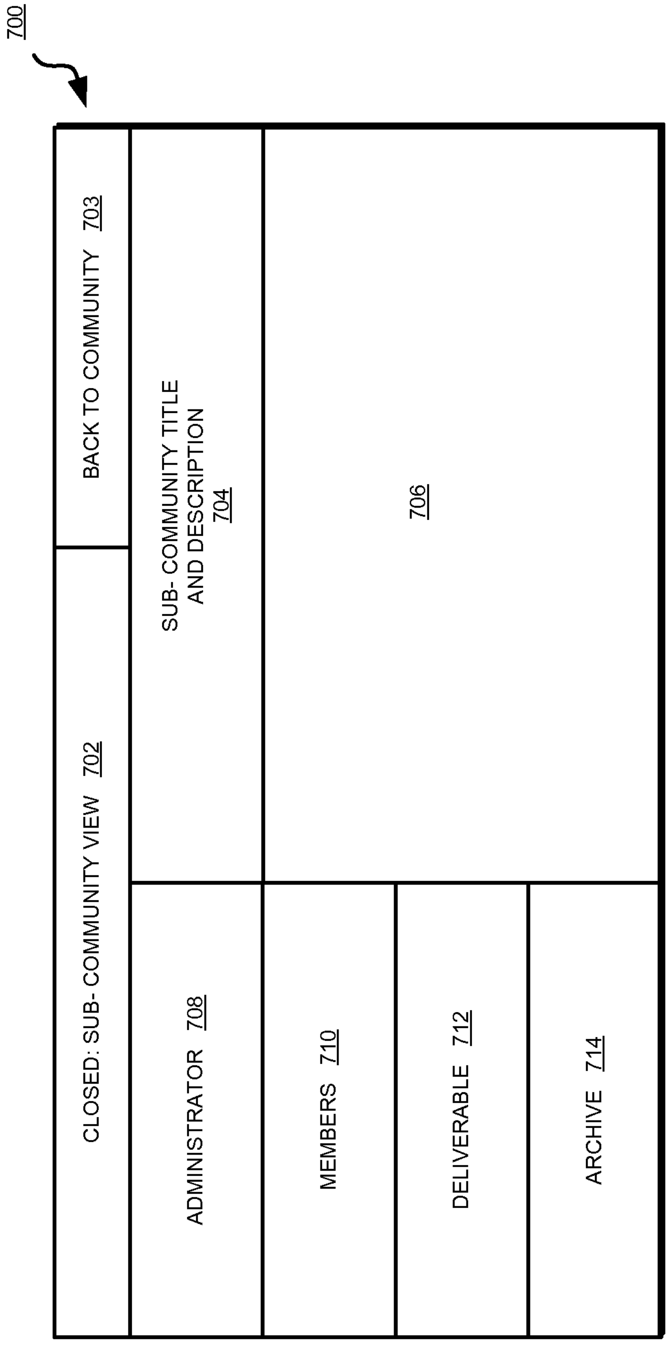
FIG. 7 depicts an example graphical view of a closed sub-community in accordance with an illustrative embodiment.

With reference to FIG. 7, this figure depicts an example graphical view of a closed sub-community in accordance with an illustrative embodiment. View 700 can be presented in any suitable variation in a manner similar to view 600 in FIG. 6.

In an example embodiment, view 700 includes name 702 of the view. In the depicted example, view 700 is called a "closed: sub-community view" and presents a summarized view of a closed sub-community. Reference 703 refers back to the community to which the displayed sub-community belonged and allows a user to return to the community's information, such as to view 400 in FIG. 4.

Further according to an embodiment, view 700 includes title and description 704 of the closed sub-community whose information is being presented in view 700. In one embodiment, area 706 is an area where additional information relating to a component of view 700 can be presented. For example, a logo or branding associated with the closed sub-community can be displayed in area 706 when view 700 initially presents the information about a closed sub-community.

According to an embodiment, view 700 includes reference 708 to an administrator, manager, creator, or controller who had created the now-closed sub-community. Reference 708 refers to the members who participated in the now-closed sub-community. In one embodiment, references 708 and 710 may be links, which present the administrator's information or a list of the now-closed sub-community's members, respectively, in area 706 when clicked.

Similarly, view 700 includes reference 712 to deliverables of the now-closed sub-community. For example, reference 712 may present links to one or more deliverables of the sub-community in area 706 when clicked. In one embodiment, such presentation of links to the deliverable work products may further have associated therewith a method for selecting a product to perform an Operation relative to the selected product. Some example operations relative to a deliverable work product include adding a deliverable to a resource library of another active sub-community, or merging the deliverable work product up with other deliverable work products from other sub-communities, such as to create a deliverable package.

Reference 714 to an archive may similarly be a link to an archive where some or all of the products of the now-closed sub-community may be stored. For example, reference 714 may include a link, which presents a query form for a database in area 706 when clicked.

The layout of views 400, 500, 600, or 700 in FIG. 4, 5, 6, or 7, respectively, are only examples for illustrating the operations of various embodiments. Similarly, the manner of presenting information in parts of views 400, 500, 600, or 700 and the list of references described in those views are also described only as examples. Such examples are not intended to be limiting on the illustrative embodiments. Many other ways of performing similar operations will be apparent to those of ordinary skill in the art from this disclosure and the same are contemplated within the scope of the illustrative embodiments.

Figure 8:
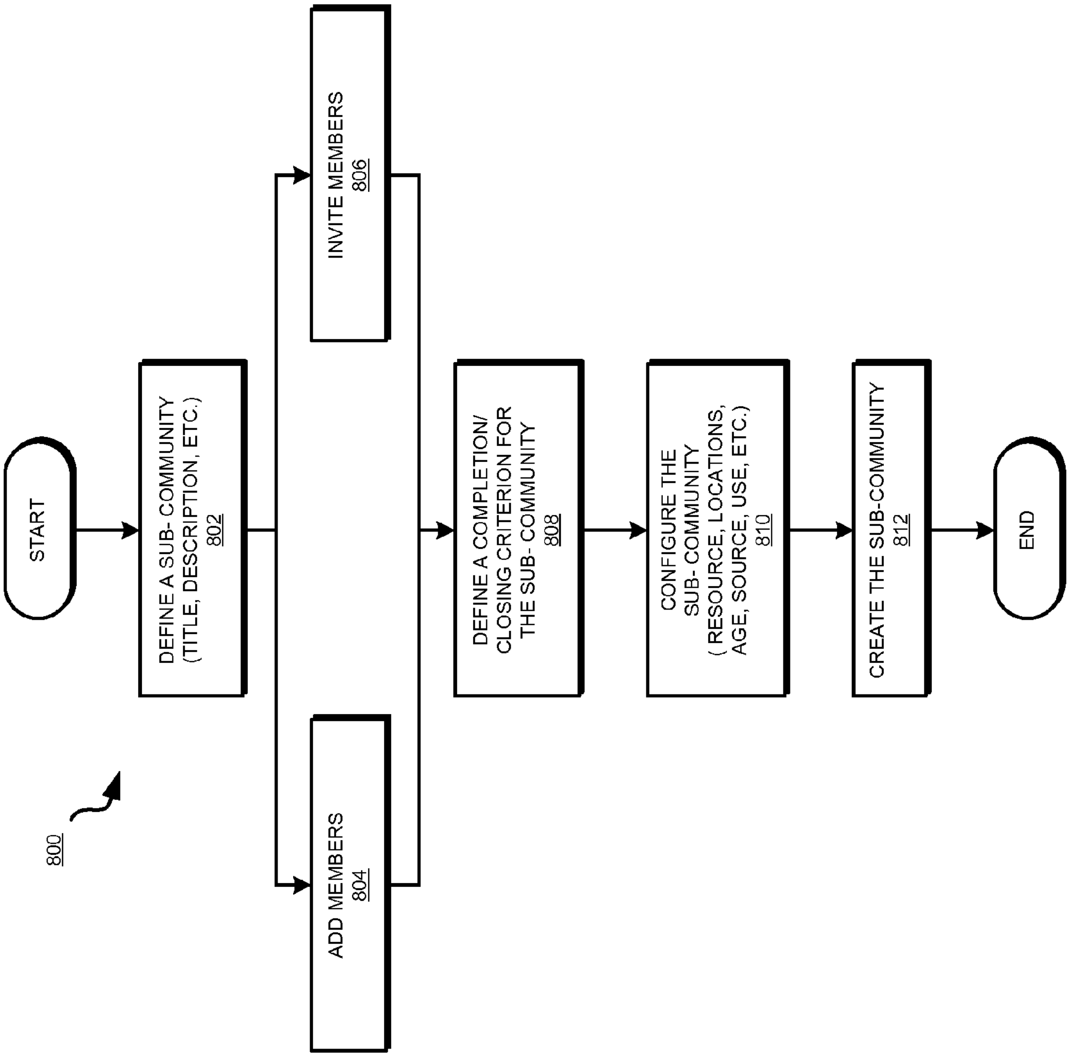
FIG. 8 depicts a flowchart of an example process of configuring a sub-community for managing the products of the sub-community in accordance with an illustrative embodiment.

With reference to FIG. 8, this figure depicts a flowchart of an example process of configuring a sub-community for managing the products of the sub-community in accordance with an illustrative embodiment. Process 800 can be implemented in application 302 in FIG. 3.

Process 800 begins by defining a sub-community (step 802). For example, an embodiment of process 800 defines a title, a description, and a logo for the sub-community. Process 800 adds members to the sub-community, either by adding members from the community under which the sub-community is being formed (step 804), by inviting members of communities other than the community under which the sub-community is being formed (step 806), or both.

Process 800 defines one or more completion criteria, or closing condition, for closing the sub-community, such as setting duration for a time-limited sub-community, or specifying availability of a deliverable for a goal-limited sub-community, (step 808). Process 800 configures the sub-community, such as by assigning resources to the sub-community, defining locations for scoring the products, and rules for the sub-community (step 810). For example, a rule for the sub-community may be that a resource older than a specified age should be removed from the resources available to the sub-community, a product from a certain member source should receive a specific treatment, or that a resource should be used in a certain manner, such as upon confirmation of a license.

Process 800 creates the sub-community (step 812). Process 800 ends thereafter.

Figure 9:
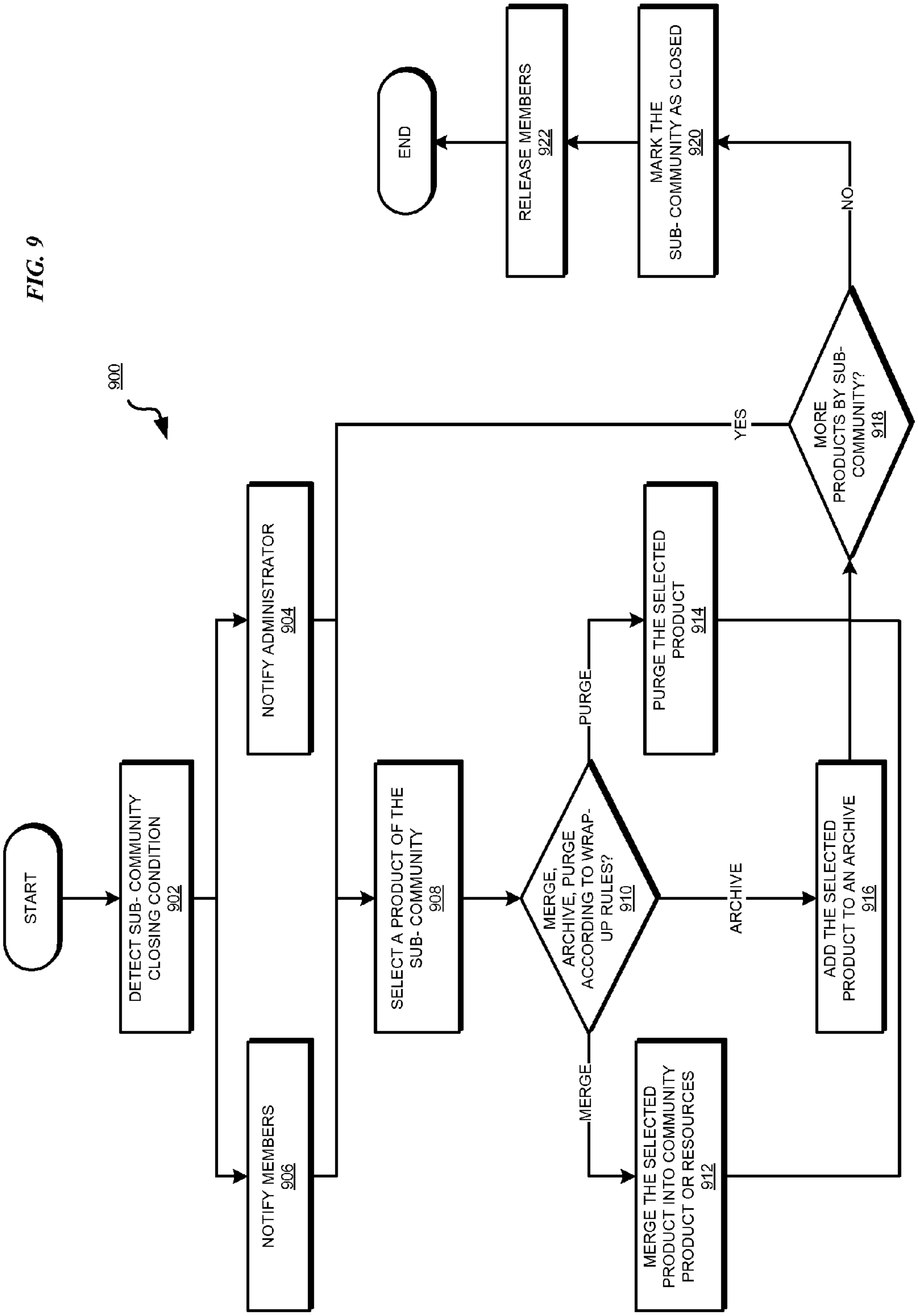
FIG. 9 depicts a flowchart of an example process of managing the products of a sub-community at closing of the sub-community in accordance with an illustrative embodiment.

With reference to FIG. 9, this figure depicts a flowchart of an example process of managing the products of a sub-community at closing of the sub-community in accordance with an illustrative embodiment. Process 900 can be implemented in application 302 in FIG. 3.

Process 900 begins by detecting a sub-community closing condition (step 902). Process 900 can notify an administrator of the sub-community whose closing condition has been detected in step 902 (step 904), notify one or more members of the sub-community (step 906), or both.

Process 900 selects a product of the sub-community (step 908). Process 900 determines whether to merge, archive, or purge the selected product (step 910) based on certain rules. For example, an example rule for two sub-communities to merge may be that active members of the sub-communities are the same and they both have un-finished items in their to-do list. Another example rule for sub-community purge may be 90% of the resources are older than 6 months. Another example rule for sub-community completion may be that the sub-community contains completed deliverables, e.g., source code and documentation.

If the selected product is to be merged ("Merge" path of step 910), process 900 merges the selected product with the community's products or resources as may be suitable (step 912). If the selected product is to be purged ("Purge" path of step 910), process 900 purges the selected product, with or without saving a stub of information about the product (step 914). If the selected product is to be archived ("Archive" path of step 910), process 900 archives the selected product in a designated archive (step 916).

Process 900 determines whether more products are available in the sub-community (step 918). If more products are available ("Yes" path of step 918), process 900 returns to step 908. If no more products are available ("No" path of step 918), process 900 marks the sub-community as closed (step 920). Process 900 releases the members from membership in the sub-community (step 922). Process 900 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for managing the products created by a sub-community operating within a community. Using an embodiment of the invention, users of the community can easily distinguish between deliverable work products of the sub-community from the byproducts of the sub-community. Using an embodiment, an administrator can configure the sub-community such that all or some of the products of the sub-community are archived for future use, purged, or merged with other community resources or products.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, infrared, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device," "computer readable storage device," and "storage device" do not encompass a signal propagation medium such as a copper cable, optical fiber, or wireless transmission medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, conventional procedural programming languages, such as the "C" programming language or similar programming languages, and mainframe programming languages such as REXX, Assembly, and Cobol. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for managing products of a sub-community operating within a community, comprising:

defining, in an application executing on a data processing system using a processor and a memory, the sub-community, wherein the community comprises a set of members working to deliver a first product, wherein the sub-community comprises a subset of the set of members working on a second product, wherein the defining configures a closing condition for the sub-community, wherein the second product is a portion of the first product, and wherein the second product comprises several parts including a deliverable product and a byproduct, the byproduct being created during development of the deliverable product;

adding a plurality of members to the sub-community;

creating the sub-community; and managing the second product of the sub-community using a set of rules, wherein a first rule in the set of rules purges a first part of the second product without saving any information about the first part, wherein a second rule in the set of rules purges a second part of the second product after saving some information about the second part, wherein a third rule archives a third part of the second product, and a fourth rule merges a fourth part of the second product with a third product of another sub-community.

2. The method of claim 1, further comprising:

detecting an occurrence of the closing condition;

determining whether to purge a part of the second product of the sub-community prior to the sub-community being closed;

performing an operation relative to the part of the second product responsive to the determining being negative; and marking the sub-community as closed.

3. The method of claim 2, further comprising:

notifying a member of the sub-community about the occurrence of the closing condition, wherein the member performs an operation relative to the part of the second product of the sub-community responsive to the notification prior to the sub-community being closed.

4. The method of claim 2, wherein the operation comprises archiving the part of the second product in an archive whose location is specified during creating the sub-community.

5. The method of claim 2, wherein the operation comprises merging the deliverable product of the second product with the first product.

6. The method of claim 1, wherein the fourth rule comprises:

determining that the other sub-community comprises a second subset of the set of members, wherein the subset and the second subset of the set of members both include a particular member;

determining that the particular member has an unfinished task in the other sub-community; and concluding that the fourth part is assigned to the particular member in the sub-community and remains unfinished, wherein the merging is responsive to the concluding.

7. The method of claim 1, wherein the first rule comprises:

determining whether at least a predetermined portion of resources used by the sub-community are older than a threshold age, wherein the purging the first part without saving any information about the first part is responsive to the determining being affirmative.

8. The method of claim 1, wherein the closing condition is a passage of a duration after a time of creation of the sub-community.

9. The method of claim 1, wherein the closing condition is an availability of the deliverable product from the sub-community.

10. The method of claim 1, wherein a member in the plurality of members is a member of a second community, the adding further comprising:

sending an invitation to the member to join the sub-community.

11. The method of claim 1, further comprising:

specifying a location of an archive where the second product will be stored, the byproduct comprising at least one of a (i) rough draft of the deliverable product, (ii) a wiki entry about the deliverable product, and (iii) write-up about the deliverable product.

12. The method of claim 1, further comprising:

creating stubs, wherein a stub in stubs corresponds to one of the several parts; and creating, using the stubs, a timeline of a development process of the second product.

13. A computer usable program product comprising a computer usable storage device including computer usable code for managing products of a sub-community operating within a community, the computer usable code comprising:

computer usable code for defining, in an application executing on a data processing system using a processor and a memory, the sub-community, wherein the community comprises a set of members working to deliver a first product, wherein the sub-community comprises a subset of the set of members working on a second product, wherein the defining configures a closing condition for the sub-community, wherein the second product is a portion of the first product, and wherein the second product comprises several parts including a deliverable product and a byproduct, the byproduct being created during development of the deliverable product;

computer usable code for adding a plurality of members to the sub-community;

computer usable code for creating the sub-community; and computer usable code for managing the second product of the sub-community using a set of rules, wherein a first rule in the set of rules purges a first part of the second product without saving any information about the first part, wherein a second rule in the set of rules purges a second part of the second product after saving some information about the second part, wherein a third rule archives a third part of the second product, and a fourth rule merges a fourth part of the second product with a third product of another sub-community.

14. The computer usable program product of claim 13, further comprising:

computer usable code for detecting an occurrence of the closing condition;

computer usable code for determining whether to purge a part of the second product of the sub-community prior to the sub-community being closed;

computer usable code for performing an operation relative to the part of the second product responsive to the determining being negative; and computer usable code for marking the sub-community as closed.

15. The computer usable program product of claim 14, further comprising:

computer usable code for notifying a member of the sub-community about the occurrence of the closing condition, wherein the member performs an operation relative to the part of the second product of the sub-community responsive to the notification prior to the sub-community being closed.

16. The computer usable program product of claim 14, wherein the operation comprises archiving the part of the second product in an archive whose location is specified during creating the sub-community.

17. The computer usable program product of claim 13, wherein the computer usable code is stored in a computer readable storage medium in a data processing system, and wherein the computer usable code is transferred over a network from a remote data processing system.

18. The computer usable program product of claim 13, wherein the computer usable code is stored in a computer readable storage medium in a server data processing system, and wherein the computer usable code is downloaded over a network to a remote data processing system for use in a computer readable storage medium associated with the remote data processing system.

19. The computer usable program product of claim 13, further comprising:

computer usable code for creating stubs, wherein a stub in stubs corresponds to one of the several parts; and computer usable code for creating, using the stubs, a timeline of a development process of the second product.

20. A data processing system for managing products of a sub-community operating within a community, the data processing system comprising:

a storage device including a storage medium, wherein the storage device stores computer usable program code; and a processor, wherein the processor executes the computer usable program code, and wherein the computer usable program code comprises:

computer usable code for defining, in an application executing on a data processing system using a processor and a memory, the sub-community, wherein the community comprises a set of members working to deliver a first product, wherein the sub-community comprises a subset of the set of members working on a second product, wherein the defining configures a closing condition for the sub-community, wherein the second product is a portion of the first product, and wherein the second product comprises several parts including a deliverable product and a byproduct, the byproduct being created during development of the deliverable product; computer usable code for adding a plurality of members to the sub-community;

computer usable code for creating the sub-community; and computer usable code for managing the second product of the sub-community using a set of rules, wherein a first rule in the set of rules purges a first part of the second product without saving any information about the first part, wherein a second rule in the set of rules purges a second part of the second product after saving some information about the second part, wherein a third rule archives a third part of the second product, and a fourth rule merges a fourth part of the second product with a third product of another sub-community.

* * * * *